No. 740,781. PATENTED OCT. 6, 1903.
T. L. & T. J. STURTEVANT.
ELECTRICAL SPARKING IGNITER FOR GAS ENGINES.
APPLICATION FILED OCT. 9, 1901.
NO MODEL. 5 SHEETS—SHEET 1.
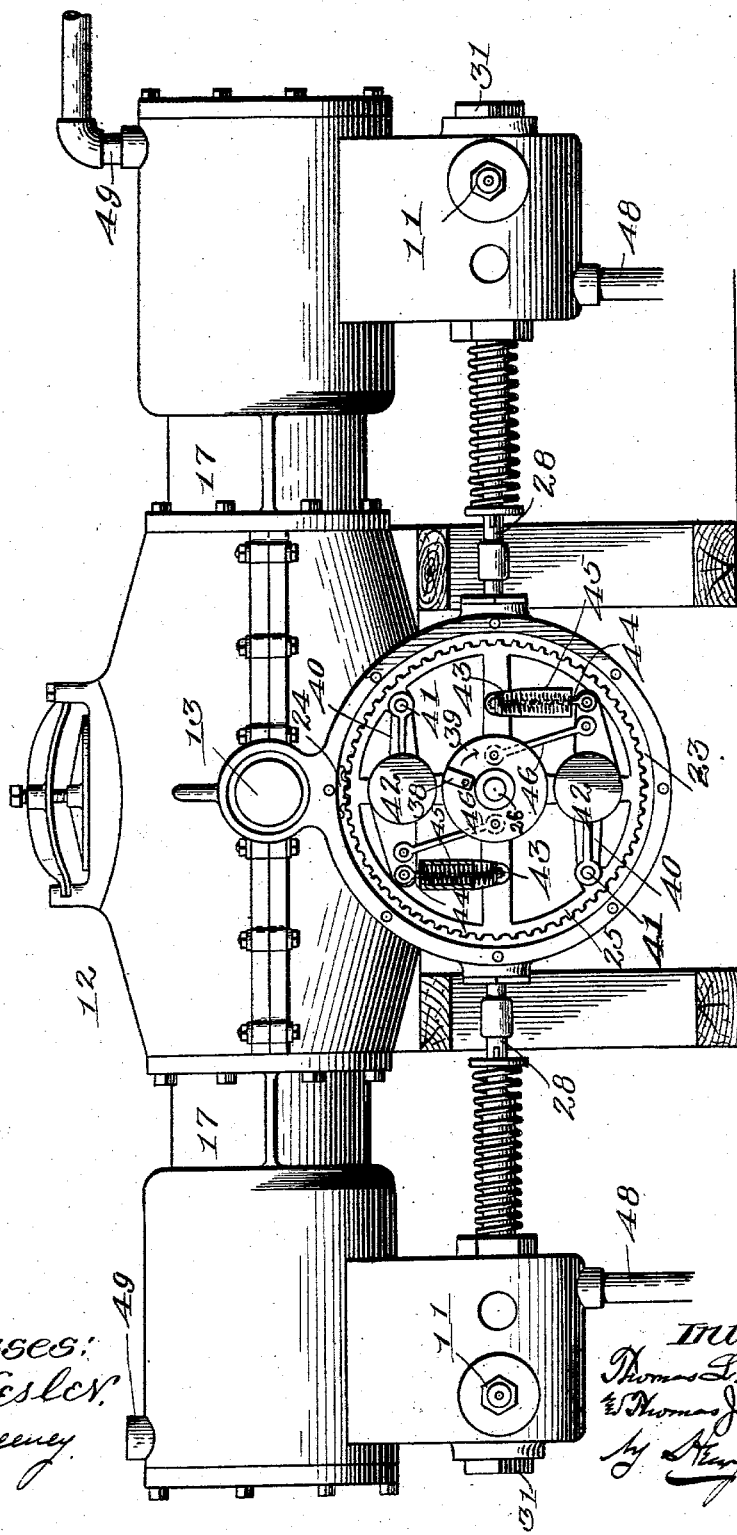

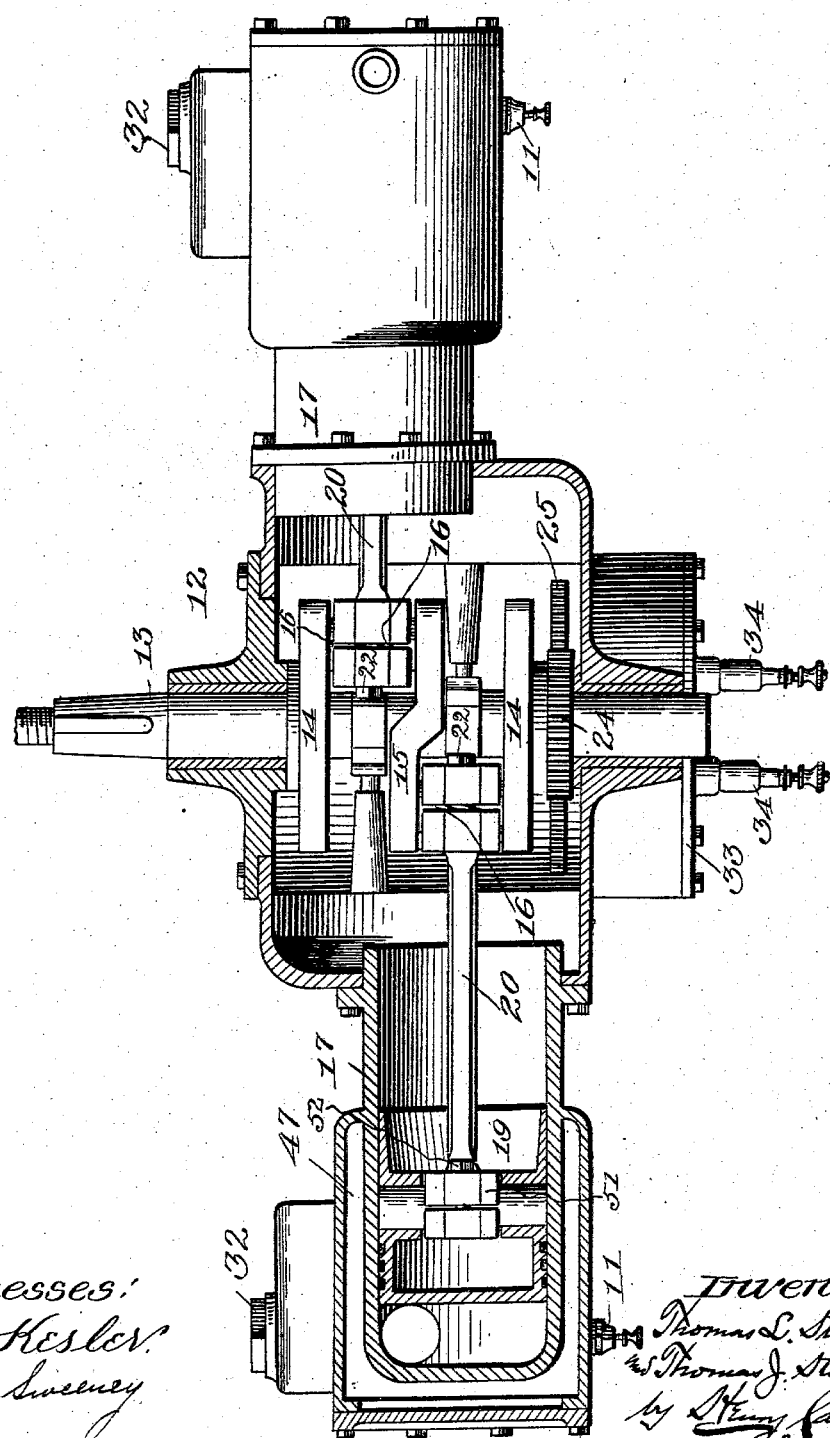

No. 740,781. PATENTED OCT. 6, 1903.
T. L. & T. J. STURTEVANT.
ELECTRICAL SPARKING IGNITER FOR GAS ENGINES.
APPLICATION FILED OCT. 9, 1901.
NO MODEL. 5 SHEETS—SHEET 3.
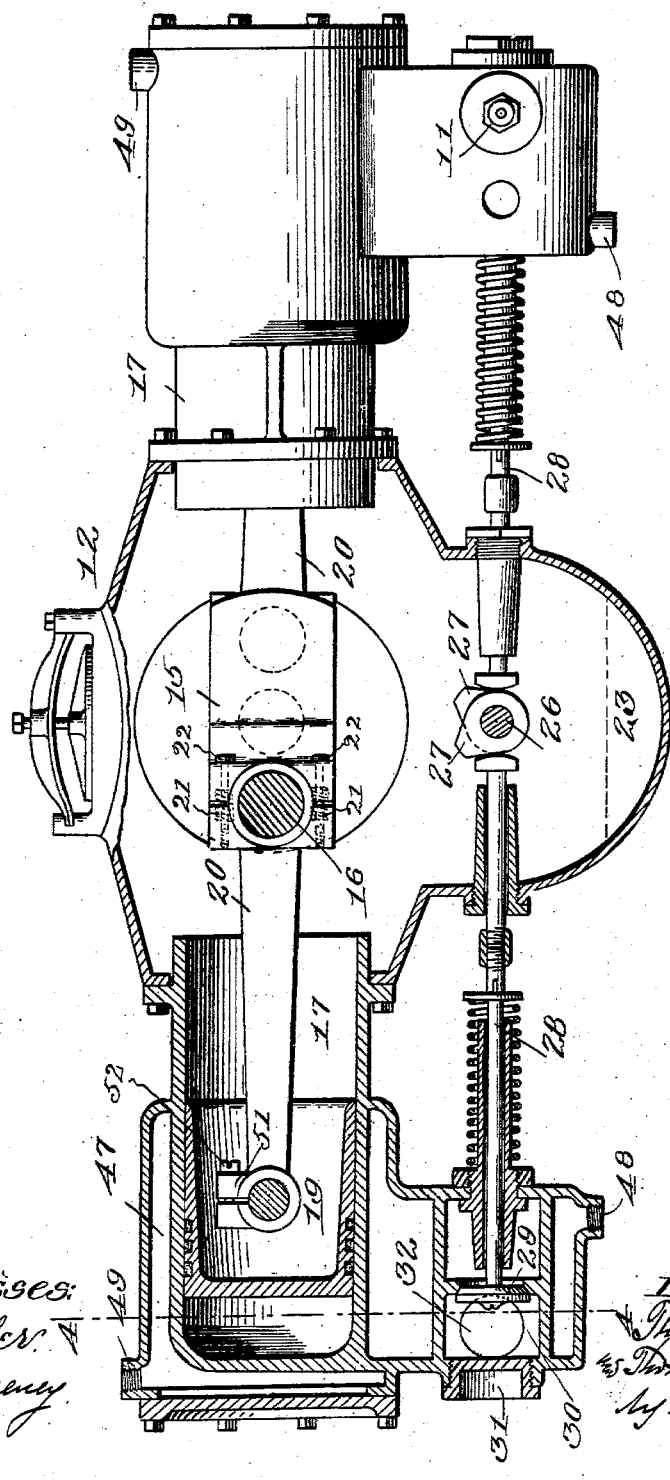

No. 740,781. PATENTED OCT. 6, 1903.
T. L. & T. J. STURTEVANT.
ELECTRICAL SPARKING IGNITER FOR GAS ENGINES.
APPLICATION FILED OCT. 9, 1901.
NO MODEL. 5 SHEETS—SHEET 4.
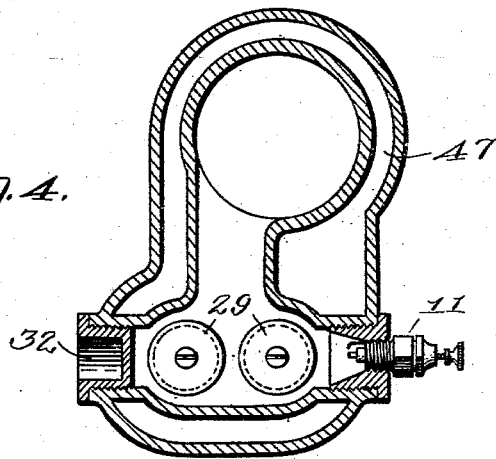
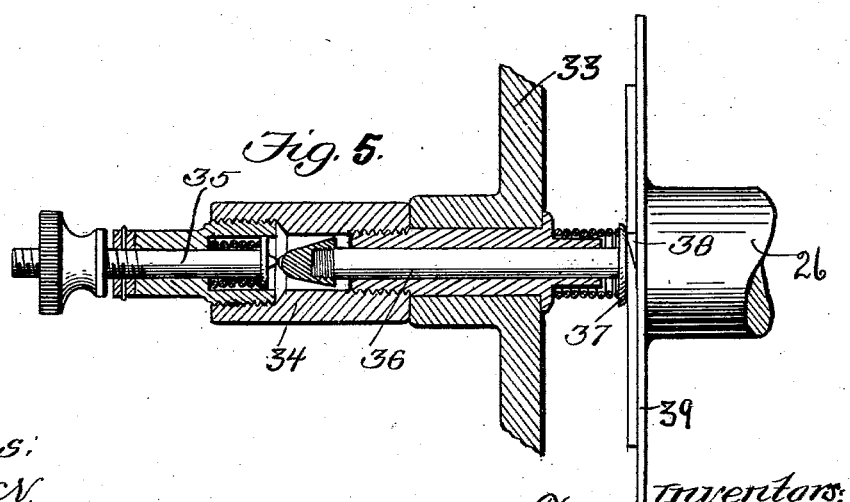

No. 740,781. PATENTED OCT. 6, 1903.
T. L. & T. J. STURTEVANT.
ELECTRICAL SPARKING IGNITER FOR GAS ENGINES.
APPLICATION FILED OCT. 9, 1901.
NO MODEL. 5 SHEETS—SHEET 5.

No. 740,781.

Patented October 6, 1903.

UNITED STATES PATENT OFFICE.

THOMAS L. STURTEVANT, OF QUINCY, AND THOMAS J. STURTEVANT, OF NEWTON CENTER, MASSACHUSETTS.

ELECTRICAL SPARKING IGNITER FOR GAS-ENGINES.

SPECIFICATION forming part of Letters Patent No. 740,781, dated October 6, 1903.

Application filed October 9, 1901. Serial No. 78,083. (No model.)

*To all whom it may concern:*

Be it known that we, THOMAS L. STURTEVANT, residing at Quincy, in the county of Norfolk, and THOMAS J. STURTEVANT, residing at Newton Center, in the county of Middlesex, State of Massachusetts, citizens of the United States, have invented certain new and useful Improvements in Electrical Sparking Igniters for Gas-Engines, of which the following is a specification, reference being had therein to the accompanying drawings.

Our invention relates to that class of gas or explosion engines more particularly intended for use for driving motor-vehicles or boats, the object of our invention being to provide a balanced gas-engine of comparatively simple construction which will work smoothly or with as little vibration as possible and which is so constructed that the working parts most likely to require attention will be conveniently accessible for adjustment or repairs.

Figure 6:
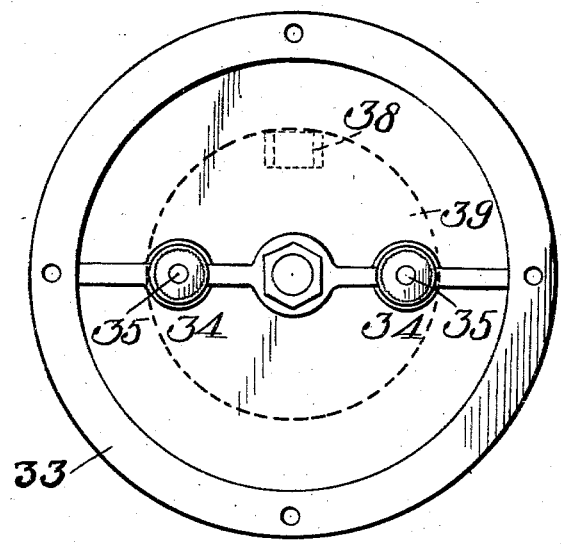
Figure 7:
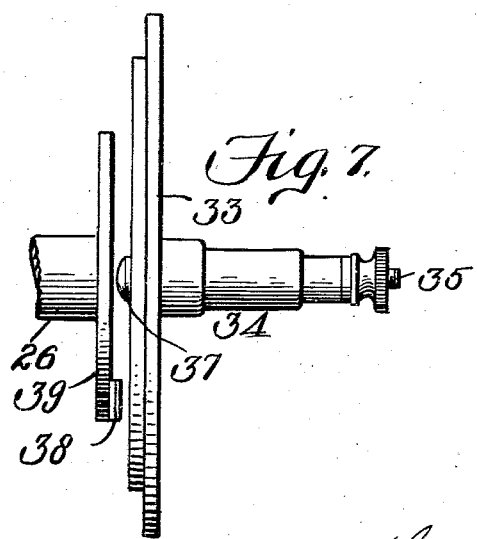

In the accompanying drawings, Figure 1 is a side view of our improved engine with the side covering-plate of the main casing removed to show the governor for the sparking devices. Fig. 2 is a plan view of the engine, partly in horizontal section. Fig. 3 is a side view of the same, partly in vertical section. Fig. 4 is a transverse sectional view on line 4 4, Fig. 3, through the cylinder and valve-chamber. Fig. 5 is a detail view of a part of the sparking mechanism. Fig. 6 is a face view of the cover-plate with the make-and-break sparking plugs mounted thereon and with the cam-disk for operating the same shown behind in dotted lines, and Fig. 7 is a side view showing the same parts.

Referring to the drawings, 12 denotes the main casing of the engine, in which is mounted in suitable bearings the main crank-shaft, comprising the bearing or end portions 13, the outside disks 14, and the intermediate offset disk 15, the cranks 16 being connected to the said outside and intermediate disks. By forming the intermediate disk or web 15 with offset portions, as shown, we are enabled to bring the cylinders 17 more nearly opposite each other than would otherwise be possible and still permit the cranks to be sufficiently long as to afford adequate bearing-surfaces. In other words, the offset or intermediate disk or web 15 permits of the use of relatively long cranks in a comparatively compact space and enables the cylinders of the engine to be arranged nearly opposite each other. The cranks 16 are joined to the pistons 19 within the cylinders 17 by connecting-rods 20.

The main casing 12 is constructed at its lower part to form an oil-chamber 23, which will be supplied with oil, as denoted in dotted lines in Fig. 3. The main crank-shaft is provided with a gear-wheel 24, meshing with a larger gear-wheel 25 on a shaft 26 and which gear-wheel 25 is of proper size to dip into the oil in the oil-chamber 23. This gear-wheel 25 serves as a splasher for oiling the interiors of the cylinders and also for oiling the cranks and other running parts within the main casing, and it is so arranged as not to be directly opposite the chambers of either of the cylinders, so that it will not throw oil directly into the chambers of the cylinders; but by splashing it about generally in the chamber of the main casing the oil will naturally work its way into the parts to be lubricated, but without flooding the said parts with oil. We thus avoid an objection which sometimes arises from an excess of oil in the cylinders, in which case the oil works past the pistons into the combustion-chambers and by burning therein causes smoke and soot, which clogs up the parts and is thus seriously objectionable.

The shaft 26 is provided with cams 27 for operating the spring-pressed valve-rods 28, carrying the valves 29, controlling the openings to the sparking chambers 30, into which the sparking devices or plugs 11 extend. The chambers 30 are preferably provided with removable plugs 31, closing openings through which the valves may be removed, and also with plugs 32, through which when the said plugs 32 are removed the sparking can be observed.

The oil-chamber portion of the main casing is closed by the removable cover or plate 33, in which are mounted the make-and-break plugs 34, forming part of the sparking or igniting mechanism, and which plugs have suitable electrical connections with the sparking plugs 11, so that the electric circuits can be closed and opened at the proper times. These make-and-break plugs each comprise a spring-pressed anvil rod or portion 35 and a spring-pressed hammer rod or portion 36. The hammer-rods 36 of the make-and-break plugs extend inward and are provided with small disks or caps 37, arranged in the path of movement of a cam 38, carried by a ring or disk 39, mounted on the shaft 26 and connected with the gear-wheel 25, so as to rotate therewith, excepting as its movements are controlled by a governing device to be described presently.

The cam 38 on the disk 39 is so arranged that when it strikes the caps 37 on the hammer-rods of the make-and-break plugs it will give slight turning movements to the said hammer-rods by reason of the side contact of the said cam with the said caps, so that the cam not only forces the hammer portions of said plugs inward into contact with the elastically-mounted anvil portions thereof, but owing to the slight rotary or twisting movements imparted to the hammer-rods both the hammer and anvil surfaces are kept clean by the rubbing contact incidental to the twisting movements imparted to the hammer-rods. This is important owing to the fact that the contact-surfaces by thus being kept clean will insure a proper sparking, while the elastically-mounted anvil-rods prevent any injurious contacts from resulting from the impacts of these make-and-break parts of the sparking devices.

The removable cover or plate 33 is central with the shaft 26, carrying the wheel 25, the valve-cams, and the sparking-governing devices, so that by removing said cover or plate easy access is afforded to these parts, which may be removed, if desired, through the opening closed by this cover or plate.

The governing device for the sparking mechanism comprises the levers 40, mounted on pivots 41 on the gear-wheel 25 and provided with weights 42. The outer ends of the levers 40 are drawn inward toward the center of the gear-wheel by springs 43, surrounding rods 44, jointed to the outer ends of the levers 40, said springs being partly housed in the cylinders 45, carried by the said gear-wheel. When the rotation of the gear-wheel is sufficiently rapid, so that the stress of the springs is overcome by the centrifugal action of the weighted levers, the cam-disk will be turned somewhat in the direction of the arrow, Fig. 1, through the links 46 connecting the levers 40 with the said disk, and when the speed of rotation of the said gear-wheel is lessened the said cam-disk will be moved in a reverse direction by the action of the said springs. Thus the cam 38 on the said cam-disk 39 will be moved forward or backward relative to the gear-wheel 25 for the purpose of varying the timing of the sparking in the combustion-chambers of the engine, as it is desirable in varying the speed of the engine, the time of sparking being earlier as the engine runs faster.

The cylinders of the engine are provided with double walls, forming between them spaces or chambers 47 for the circulation of water to cool the said cylinders, said chambers being provided with inlet-pipes 48 and outlet-pipes 49. A proper circulation of water through these chambers or water-jackets for the purpose of cooling the cylinders may be maintained by pumps in the usual manner.

From the foregoing it will be apparent that we provide a balanced gas-engine of compact arrangement so as to be well adapted for driving a motor-vehicle or boat with the least possible jar or vibration, and our engine is also constructed in such a manner that the cylinders and other interior parts will be well lubricated without being flooded with oil. Also the contact portions of the make-and-break plugs of the sparking device will be kept clean and bright by the slight rotary movements imparted to the hammer-rods thereof, and the parts of the engine to which frequent access may be desirable is provided for by the removable plugs 31 and 32 and the removable cover 33.

Having thus described our invention, we claim and desire to secure by Letters Patent—

1. In an explosion-engine, the combination with a sparking device in the combustion-chamber of the engine, of a make-and-break plug comprising a spring-pressed and endwise-movable anvil-rod and a spring-pressed and endwise-movable hammer-rod, and means for causing said rods to be forced into contact at suitable intervals.

2. In an explosion-engine, the combination with a sparking device in the combustion-chamber of the engine, of a make-and-break plug comprising an elastically-mounted anvil rod or portion and an elastically-mounted hammer rod or portion, and means for causing the said portions of the make-and-break plug to be forced into contact at suitable intervals, the said hammer-rod being provided with a cap or portion adapted to be engaged by said means in such a manner as to impart partial rotary movements to said hammer-rod at each contact of the said cam with the said cap.

3. In an explosion-engine, the combination with a sparking device located in the combustion-chamber of the engine, of a make-and-break device comprising two endwise-separable parts, means for forcing said separable parts into contact with each other at intervals, and means for imparting partial rotary movements, constantly in the same direction, to one of said separable parts as they are forced into endwise contact with each other.

4. In an explosion-engine, the combination with a sparking device located in the combustion-chamber of the engine, of a make-and-break plug comprising an elastically-mounted and endwise-movable anvil-rod and an elastically-mounted and endwise-movable hammer-rod, a cam for forcing one of said rods into contact with the other, at intervals, and an automatic governor for regulating the timing position of said cam as the engine runs faster or slower.

5. In an explosion-engine, the combination with the main casing thereof provided with an opening, of an actuating-cam for the sparking device and an automatic regulator for the said cam both arranged opposite said opening and removable therethrough when the opening is not closed, a removable plate or cover closing the said opening and on which removable plate or cover the make-and-break plugs are mounted.

In testimony whereof we affix our signatures in presence of two witnesses.

THOMAS L. STURTEVANT.
THOMAS J. STURTEVANT.

Witnesses:
L. H. STURTEVANT,
W. H. ELLIS.